(12) United States Patent
Chenoweth et al.

(10) Patent No.: US 11,028,755 B2
(45) Date of Patent: Jun. 8, 2021

(54) ROTATIONAL EXHAUST FLOW CONTROL FOR DIESEL EXHAUST FLUID INJECTION

(71) Applicant: Caterpillar Inc., Deerfield, IL (US)

(72) Inventors: Kurtis Chenoweth, Ipava, IL (US); Jianping Pan, Dunlap, IL (US); Mohamed Daoud, Dunlap, IL (US); Srinivasa Perumal Velu, Dunlap, IL (US); Arvind Jujare, Peoria, IL (US); Y. T. Bui, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 36 days.

(21) Appl. No.: 16/359,885

(22) Filed: Mar. 20, 2019

(65) Prior Publication Data

US 2020/0300146 A1 Sep. 24, 2020

(51) Int. Cl.
*F01N 3/28* (2006.01)
*B01F 11/00* (2006.01)
*F01N 3/20* (2006.01)
*B01F 5/06* (2006.01)

(52) U.S. Cl.
CPC ........ *F01N 3/2892* (2013.01); *B01F 11/0002* (2013.01); *F01N 3/208* (2013.01); *B01F 2005/0637* (2013.01); *F01N 2610/02* (2013.01)

(58) Field of Classification Search
CPC .............. F01N 2610/02; F01N 3/2066; F01N 2240/20; F01N 2610/1453; F01N 3/2892; F01N 13/009; F01N 13/08; F01N 2470/18; F01N 3/021; F01N 2470/02; F01N 13/0097; F01N 13/1816; F01N 2240/40; F01N 2290/04; F01N 2470/24; F01N 2560/026; F01N 2610/102; F01N 3/08; F01N 3/0821; F01N 3/10; F01N 3/106; F01N 3/20; F01N 3/206; F01N 3/208; F01N 3/24; F01N 3/36; B01F 2005/0091; B01F 5/0451; B01F 5/0062; B01F 2005/0639; B01F 5/0473; B01F 5/0606; B01F 5/061
See application file for complete search history.

(56) References Cited

U.S. PATENT DOCUMENTS

| | | | |
|---|---|---|---|
| 4,929,088 A * | 5/1990 | Smith | .................. B01F 5/0473 138/40 |
| 5,992,141 A | 11/1999 | Berriman et al. | |
| 8,747,788 B1 | 6/2014 | Baig et al. | |
| 8,826,649 B2 | 9/2014 | Li et al. | |
| 10,626,767 B2 * | 4/2020 | Tomita | .................. F01N 3/0821 |

(Continued)

FOREIGN PATENT DOCUMENTS

| CN | 102302906 A | 1/2012 |
|---|---|---|
| CN | 103657411 A | 3/2014 |

(Continued)

*Primary Examiner* — Anthony Ayala Delgado
(74) *Attorney, Agent, or Firm* — Harrity & Harrity LLP

(57) ABSTRACT

A selective catalytic reduction (SCR) system is disclosed. The SCR system may include a mixing tube with a mixing tube inlet; a diesel exhaust fluid (DEF) injector proximate to the mixing tube inlet; and a flow control device proximate to the mixing tube inlet, wherein the flow control device is positioned within the mixing tube or affixed to the mixing tube inlet, and wherein the flow control device includes a plurality of vanes arranged around a center of the flow control device.

20 Claims, 3 Drawing Sheets

(56) References Cited

U.S. PATENT DOCUMENTS

| | | | |
|---|---|---|---|
| 2011/0308234 A1* | 12/2011 | De Rudder | F01N 3/2066 60/295 |
| 2013/0170973 A1* | 7/2013 | Staskowiak | B01F 5/0616 415/208.1 |
| 2014/0033686 A1* | 2/2014 | Fischer | F01N 3/2892 60/286 |
| 2015/0308316 A1* | 10/2015 | Li | F01N 13/009 60/295 |
| 2016/0265409 A1* | 9/2016 | Puschel | B01D 53/94 |
| 2020/0123955 A1* | 4/2020 | Liu | B01F 5/0619 |

FOREIGN PATENT DOCUMENTS

| | | |
|---|---|---|
| CN | 103883379 A | 6/2014 |
| DE | 102013210955 A1 | 12/2014 |
| DE | 102014018852 | 6/2016 |
| KR | 20170027525 A | 3/2017 |
| WO | 2010032077 | 3/2010 |
| WO | WO2017169521 A1 | 10/2017 |

\* cited by examiner

ROTATIONAL EXHAUST FLOW CONTROL FOR DIESEL EXHAUST FLUID INJECTION

TECHNICAL FIELD

The present disclosure relates generally to a diesel engine and, more particularly, to a rotational exhaust flow control for diesel exhaust fluid (DEF) injection.

BACKGROUND

Selective Catalytic Reduction (SCR) is an active emissions control technique where a liquid-reductant agent is injected using a special catalyst into the exhaust stream of a diesel engine. The reductant source is sometimes automotive-grade urea, otherwise known as Diesel Exhaust Fluid (DEF). A system that performs SCR may be referred to herein as an SCR system. An SCR system may include a mixing tube to provide a location for DEF injection to occur and to provide space for the DEF to evaporate and leave behind ammonia to react with the SCR. The evaporation will occur with enough temperature and distance, but the required distance to do this in only the exhaust stream is not practical for many installations. Thus, the evaporation is accelerated using a mixer. One failure that may occur when a mixer is too close to the injection point is that the DEF will cool the surface of the mixer and leave behind crystalized ammonia, resulting in deposit growth and negatively impacting performance of the SCR system.

An exhaust flow entering a tube or pipe tangentially may create a downstream rotational flow, forcing the DEF to impinge on the wall too early. However, restricting all rotation of the exhaust flow will limit the amount of downstream mixing resulting in low uniformity. Flow laminators, such as a honeycomb-based flow laminator, are sometimes used to reduce rotation of exhaust flow, but deep honeycomb structures can result in backpressure penalties and will be costly to manufacture.

One attempt to control a gas flow for an SCR system is disclosed in U.S. Pat. No. 8,826,649 that issued to Li on Sep. 9, 2014 ("the '649 patent"). In particular, the '649 patent discloses "an assembly for mixing liquid within a gas flow includes a hollow conduit that is configured for containing a flow of gas and liquid droplets. The assembly also includes multiple spaced blades and an impingement element. Each of the blades is operatively connected to and extends from the impingement element and is connected to an inner wall of the conduit. The impingement element is upstream of the blades in the flow of gas. The impingement element and the blades are configured to create a preferred distribution of the liquid droplets within the gas flow downstream of the blades within the conduit." "The impingement element and the blades may be directed toward an outer annular region of the flow of gas within the conduit and may create a turbulent flow in the outer annular region. In other embodiments, the impingement element and the blades may create a substantially uniform distribution of the liquid droplets in the downstream gas flow."

While the assembly of the '649 patent may disclose spaced blades and an impingement element in a vehicle exhaust treatment system, the assembly of the '649 patent may increase the turbulence of the exhaust flow proximate to the walls of the conduit (e.g., in the outer annular region of the flow described above). This may lead to a high concentration of DEF contact on the walls of the conduit, causing ammonia deposit due to premature cooling of the DEF mixture.

The SCR system including the flow control device of the present disclosure solves one or more of the problems set forth above and/or other problems in the art.

SUMMARY

A selective catalytic reduction (SCR) system may comprise a mixing tube with a mixing tube inlet; a diesel exhaust fluid (DEF) injector proximate to the mixing tube inlet; and a flow control device proximate to the mixing tube inlet, wherein the flow control device is positioned within the mixing tube or affixed to the mixing tube inlet, and wherein the flow control device includes a plurality of vanes arranged around a center of the flow control device.

A DEF system may comprise a mixing tube having a mixing tube inlet and a mixing tube outlet, wherein a mixture of exhaust and DEF is to flow from the mixing tube inlet to the mixing tube outlet; a DEF injector proximate to the mixing tube inlet; and a flow control device, wherein the flow control device includes a plurality of vanes arranged coaxially with the mixing tube, and wherein the flow control device is configured to achieve a particular ratio of radial flow to axial flow for the mixture.

A SCR system may comprise an exhaust inlet to receive an exhaust flow; a mixing tube, downstream from the exhaust flow, with a mixing tube inlet; a DEF injector in the mixing tube to inject DEF for the exhaust flow, wherein the mixing tube is to mix the DEF with the exhaust flow; and a flow control device proximate to the mixing tube inlet, wherein the flow control device is positioned within the mixing tube or affixed to the mixing tube inlet, and wherein the flow control device includes a plurality of vanes arranged around a center of the flow control device.

DETAILED DESCRIPTION

This disclosure relates to a SCR system. The SCR system has universal applicability to any machine utilizing a diesel engine that is associated with an SCR system.

Figure 1:
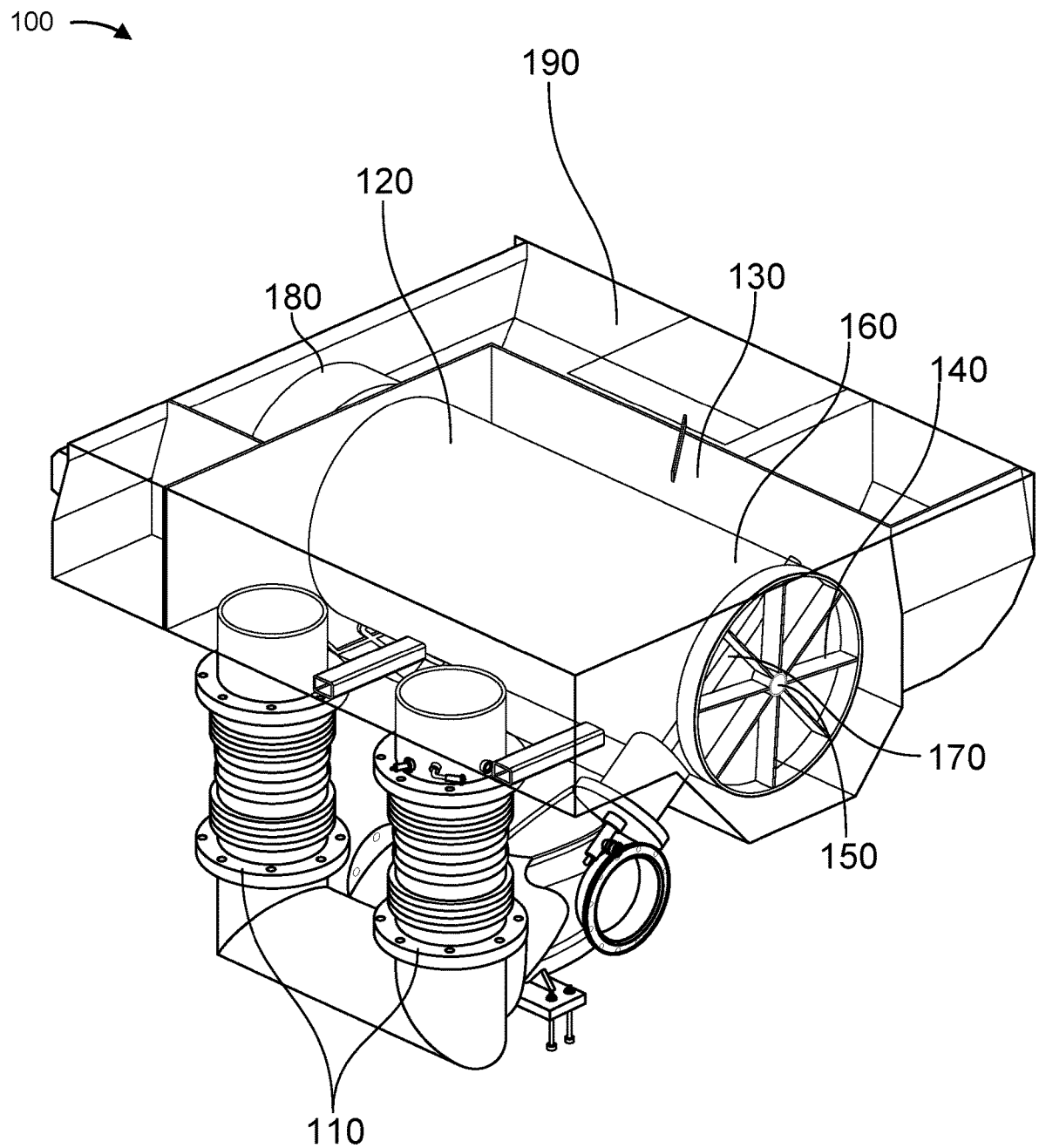
FIG. 1 is a diagram of an example SCR system.

FIG. 1 is a diagram of an example SCR system 100. Example SCR system 100 includes an exhaust inlet 110. An exhaust flow may enter SCR system 100 at the exhaust inlet 110 and may proceed to DEF injection system 120. For example, the exhaust flow may flow around DEF injection system 120 in chamber 130, and may enter DEF injection system 120 at a mixing tube inlet 140. Chamber 130 may at least partially enclose mixing tube 160.

The exhaust flow may traverse flow control device 150 as the exhaust flow enters DEF injection system 120. Flow control device 150 includes a plurality of vanes (shown here as 8 vanes) arranged around a center of mixing tube 160 or flow control device 150. The plurality of vanes may be arranged around an axis of flow control device 150 (e.g., coaxially with mixing tube 160). For example, the plurality of vanes may be evenly spaced around the axis. Flow control device 150 is described in more detail in connection with FIG. 2, below. Flow control device 150 may reduce rotational flow of the exhaust flow in the mixing tube 160. For example, flow control device 150 may be configured to reduce a radial-to-axial flow ratio of the exhaust flow to within a particular range such as a target range, as described in more detail elsewhere herein. Flow control device 150 may be positioned within mixing tube 160 or affixed to mixing tube inlet 140. In some implementations, flow control device 150 may be proximate to mixing tube inlet 140. For example, flow control device 150 may be within a particular distance of mixing tube inlet 140, may be closer to mixing tube inlet 140 than mixing tube outlet 180, may be within 25 percent of the length of mixing tube 160 relative to mixing tube inlet 140, and/or the like.

Mixing tube 160 may mix DEF with the exhaust flow based, at least in part, on rotational flow of the exhaust flow. For example, the DEF may be injected or sprayed into mixing tube 160 by DEF injector 170. DEF injector 170 may be downstream (based on the exhaust flow) from flow control device 150 and/or may be in mixing tube 160. For example, flow control device 150 may be provided between DEF injector 170 and chamber 130. A higher rate of rotational flow may correspond to a higher rate of DEF impingement on a wall of mixing tube 160. A lower rate of rotational flow may correspond to a lower rate of mixing and evaporation of the DEF. As used herein, "rotational flow" and "radial flow" refer to a flow of the exhaust flow substantially around a longitudinal axis of mixing tube 160 (e.g., having an angular velocity around the longitudinal axis).

The exhaust flow may flow through mixing tube 160 to a mixing tube outlet 180. Mixing tube outlet 180 may include a mixer assembly (shown in and described in connection with FIG. 2). After flowing through the mixer assembly, the exhaust flow may continue to an attenuation chamber 190, where noise associated with the exhaust flow may be attenuated.

As indicated above, FIG. 1 is provided as an example. Other examples may differ from what was described in connection with FIG. 1. For example, in some implementations, SCR system 100 may include an inlet sensor, an outlet sensor, a diffuser, a catalyst, a tail pipe, and/or the like (not shown in FIG. 1).

Figure 2:
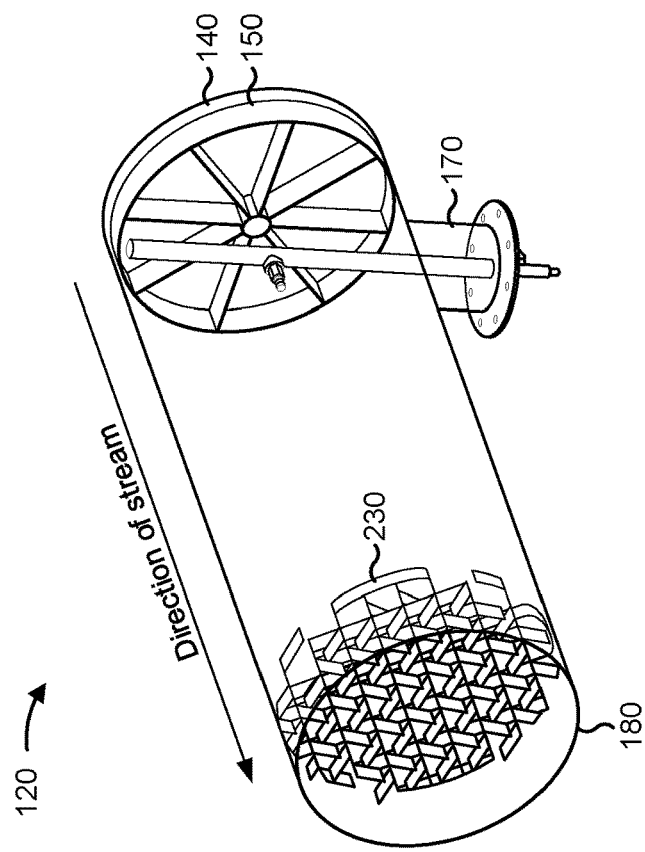
FIG. 2 is a diagram of an example DEF injection system and an example flow control device that may be used with the SCR system of FIG. 1.
Figure 2:
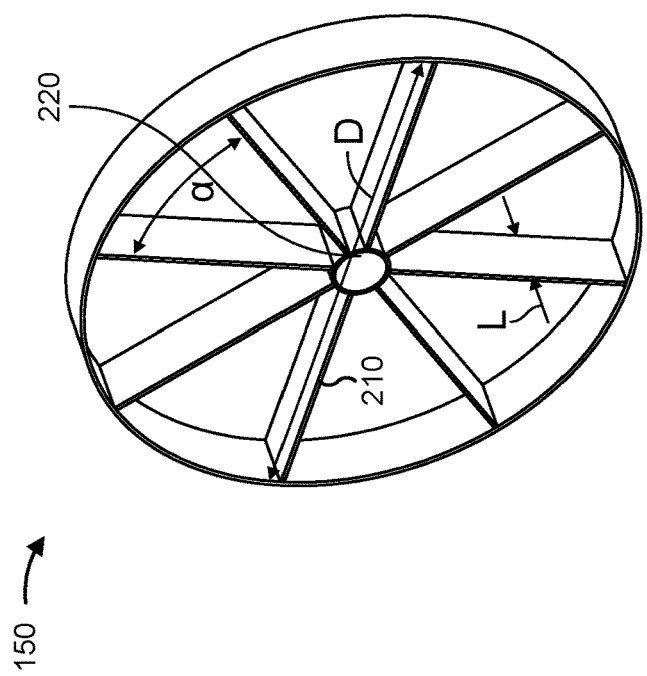

FIG. 2 is a diagram of an example DEF injection system 120 and an example flow control device 150 that may be used with the SCR system 100 of FIG. 1. As shown in the left part of FIG. 2, flow control device 150 may include a plurality of vanes 210 (e.g., two or more vanes 210). Furthermore, flow control device 150 (and/or mixing tube 160) may be associated with a diameter D. Flow control device 150 (and/or the vanes 210) may be associated with a vane depth L (sometimes described herein as a depth of a vane, a depth of flow control device 150, and/or the like). Flow control device 150 may be associated with a spacing between vanes 210, shown here by α. In some cases, α may be referred to as a vane angle, an angular offset, and/or the like. In some implementations, α may be equal between each pair of adjacent vanes 210 of flow control device 150. As further shown, flow control device 150 may include a center 220. Center 220 may be solid (e.g., filled in) or may be hollow (e.g., may include an opening parallel to the longitudinal axis of flow control device 150). Vanes 210 may be affixed to center 220. As shown in the right part of FIG. 2, DEF injection system 120 may include a mixer assembly 230. Mixer assembly 230 may mix DEF and exhaust after the DEF and exhaust flow through mixing tube 160.

As indicated above, FIG. 2 is provided as an example. Other examples may differ from what was described in connection with FIG. 2.

Figure 3:
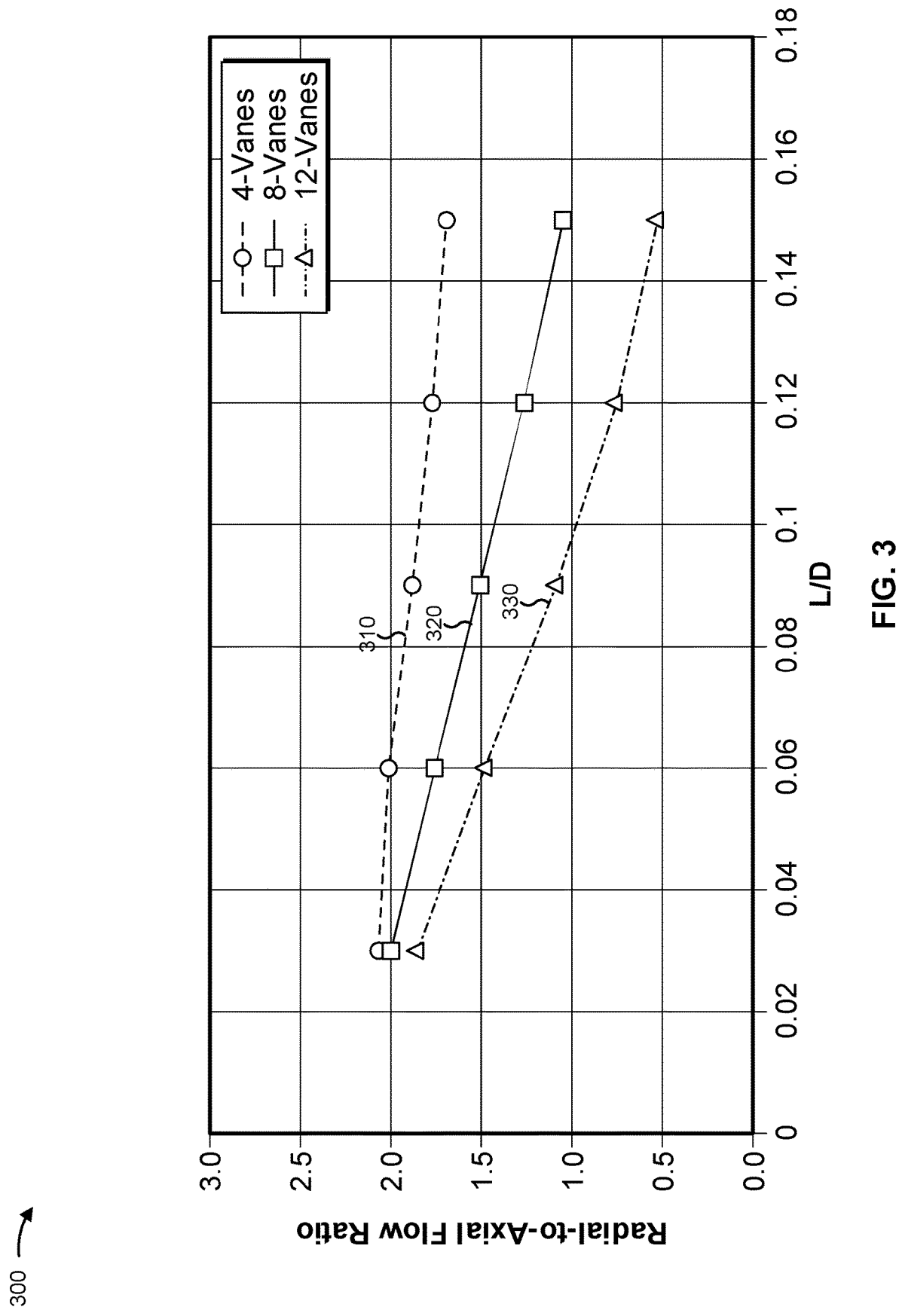
FIG. 3 is a diagram of an example chart of results that may be achieved using the example SCR system of FIG. 1.

FIG. 3 is a diagram of an example chart 300 of results that may be achieved using the example SCR system of FIG. 1. A vertical axis of chart 300 represents a radial-to-axial flow ratio (e.g., a ratio of a radial flow rate of the exhaust flow around a center axis of mixing tube 160 to an axial flow rate of the exhaust flow along mixing tube 160). The value of 0 represents no radial flow (e.g., a laminar flow directly down mixing tube 160 with no radial velocity). A horizontal axis of chart 300 represents a ratio of the vane depth L to the mixing tube diameter D. Chart line 310 corresponds to a case wherein flow control device 150 includes 4 vanes 210. Chart line 320 corresponds to a case wherein flow control device 150 includes 8 vanes 210. Chart line 330 corresponds to a case wherein flow control device 150 includes 12 vanes 210. As can generally be seen, for a given number of vanes 210, the radial-to-axial flow ratio decreases as the L/D ratio increases. In other words, a deeper flow control device 150 may decrease the radial-to-axial flow ratio. Also, as can generally be seen, a larger number of vanes 210 may decrease the radial-to-axial flow ratio. In other words, as the number of vanes 210 increases, the radial-to-axial flow ratio decreases.

As indicated above, FIG. 3 is provided as an example. Other examples may differ from what was described in connection with FIG. 3.

INDUSTRIAL APPLICABILITY

The flow control device 150 may reduce the rotational flow rate of an exhaust flow so that the radial-to-axial flow ratio is within a particular range. For example, too high of a rotational flow rate may deposit unacceptable amounts of urea on the walls of mixing tube 160 proximate to mixing tube inlet 140. This may require maintenance and may negatively impact the performance of SCR system 100. Too low of a rotational flow rate may lead to low mixing and/or low evaporation, which may cause the DEF/exhaust mixture to reach mixer assembly 230 in an unevaporated and/or nonuniform state, thereby causing deposits on mixer assembly 230 and degrading performance of SCR system 100.

The L/D ratio and/or the number of vanes 210 of flow control device 150 may be configured so that the radial-to-axial flow ratio of the DEF/exhaust mixture is within a particular range. In some cases, this particular range may be approximately 1.4 or in a range of approximately 1.0 to approximately 2.0. For the implementations described herein, the range of approximately 1.4 or in a range of approximately 1.0 to approximately 2.0 may achieve a desired balance between the deposition of DEF on the walls of mixing tube 160 and the mixing/evaporation of the DEF/exhaust mixture before reaching mixer assembly 230. However, the implementations described herein are not limited to configurations that achieve the particular range described above. Indeed, the implementations described herein may be used to achieve any desired radial-to-axial flow rate based on configuration of the L/D ratio and the number of vanes 210.

Referring now to chart 300 of FIG. 3, it can be seen that a radial-to-axial flow ratio of approximately 1.4 can be achieved using 8 vanes 210 or 12 vanes 210. For example, when using 8 vanes 210, referring to chart line 320, an L/D ratio of approximately 0.1 may achieve the radial-to-axial flow ratio of approximately 1.4. If the desired radial-to-axial flow ratio is to fall within the range of approximately 1.0 to 2.0, then any L/D ratio between approximately 0.03 and 0.15 may be used with 8 vanes 210. When using 12 vanes 210, referring to chart line 330, an L/D ratio of approximately 0.06 may achieve the radial-to-axial flow ratio of approximately 1.4. If the desired radial-to-axial flow ratio is to fall within the range of approximately 1.0 to 2.0, then any L/D ratio between approximately 0.02 and 0.10 may be used with 8 vanes 210. In some cases, any number of vanes 210 may be used.

In some cases, the number of vanes 210 and/or the L/D ratio may be selected based on various concerns. For example, a higher number of vanes 210 may increase fabrication complexity, and may permit the usage of a lower L/D ratio. Thus, a higher number of vanes 210 may be particularly beneficial in situations where the value of L is constrained (e.g., in a short mixing tube 160). A lower number of vanes 210 may be simpler to fabricate than a higher number of vanes 210, thereby conserving fabrication cost. Furthermore, the usage of a higher L/D ratio may require more material than a lower L/D ratio (since flow control device 150 is deeper at a higher L/D ratio), so the material and fabrication cost of adding additional vanes 210 may be weighed against the material and fabrication cost of deepening flow control device 150.

In this way, impingement of DEF on the walls of mixing tube 160 proximate to mixing tube inlet 140 is reduced and a desirable level of mixing or evaporation of DEF and exhaust is preserved. Furthermore, various configurations of vanes 210 and L/D ratio of flow control device 150 are provided that achieve the balance between DEF impingement and mixing or evaporation. Thus, deposition of DEF in SCR system 100 may be reduced and performance of SCR system 100 may be improved.

As used herein, the articles "a" and "an" are intended to include one or more items, and may be used interchangeably with "one or more." Also, as used herein, the terms "has," "have," "having," or the like are intended to be open-ended terms. Further, the phrase "based on" is intended to mean "based, at least in part, on."

The foregoing disclosure provides illustration and description, but is not intended to be exhaustive or to limit the implementations to the precise form disclosed. Modifications and variations may be made in light of the above disclosure or may be acquired from practice of the implementations. It is intended that the specification be considered as an example only, with a true scope of the disclosure being indicated by the following claims and their equivalents. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

What is claimed is:

1. A selective catalytic reduction (SCR) system, comprising:
    a mixing tube with a mixing tube inlet;
    a diesel exhaust fluid (DEF) injector proximate to the mixing tube inlet; and
    a flow control device proximate to the mixing tube inlet,
        wherein the flow control device is positioned within the mixing tube or affixed to the mixing tube inlet,
        wherein the flow control device includes a plurality of vanes arranged around a center of the flow control device, and
        wherein a depth of a vane, of the plurality of vanes, is configured to provide a radial-to-axial flow ratio in a target range of approximately 1.0 to approximately 2.0.

2. The SCR system of claim 1, wherein a ratio of the depth of the vane to a diameter of the mixing tube is in a range of approximately 0.06 to approximately 0.1.

3. The SCR system of claim 1, wherein a number of vanes of the flow control device is configured to provide the radial-to-axial flow ratio in the target range.

4. The SCR system of claim 3, wherein the number of vanes is in a range of approximately 8 to approximately 12.

5. The SCR system of claim 1, wherein the plurality of vanes are spaced substantially equally around the center of the flow control device.

6. The SCR system of claim 1, further comprising:
    a chamber upstream from the flow control device and at least partially enclosing the mixing tube.

7. The SCR system of claim 1, wherein the DEF injector is downstream from the flow control device.

8. A diesel exhaust fluid (DEF) system, comprising:
    a mixing tube having a mixing tube inlet and a mixing tube outlet,
        wherein a mixture of exhaust and DEF is to flow from the mixing tube inlet to the mixing tube outlet;
    a DEF injector proximate to the mixing tube inlet; and
    a flow control device,
        wherein the flow control device includes a plurality of vanes arranged coaxially with the mixing tube,
        wherein a depth of a vane, of the plurality of vanes, is configured to provide a radial-to-axial flow ratio in a target range,
        wherein a ratio of the depth of the vane to a diameter of the mixing tube is in a range of approximately 0.06 to approximately 0.1, and
        wherein the radial-to-axial flow ratio is a particular ratio of radial flow to axial flow for the mixture.

9. The DEF system of claim 8, wherein the flow control device is provided between the DEF injector and a chamber that at least partially encloses the DEF system.

10. The DEF system of claim 8, further comprising a mixer assembly proximate to the mixing tube outlet.

11. The DEF system of claim 8, wherein the particular ratio is approximately 1.4.

12. The DEF system of claim 8, wherein the flow control device is configured to achieve the particular ratio based on a number of vanes of the plurality of vanes and the ratio of the depth of the vane to the diameter of the mixing tube.

13. The DEF system of claim 8, wherein a number of vanes of the plurality of vanes is in a range of approximately 8 vanes to approximately 12 vanes.

14. The DEF system of claim 8, wherein the flow control device is provided upstream from the DEF injector.

15. A selective catalytic reduction (SCR) system, comprising:
    an exhaust inlet to receive an exhaust flow;
    a mixing tube, downstream from the exhaust flow, with a mixing tube inlet;
    a diesel exhaust fluid (DEF) injector in the mixing tube to inject DEF for the exhaust flow,
        wherein the mixing tube is to mix the DEF with the exhaust flow; and a flow control device proximate to the mixing tube inlet,
        wherein the flow control device is positioned within the mixing tube or affixed to the mixing tube inlet, wherein the flow control device includes a plurality of vanes arranged around a center of the flow control device, wherein a depth of a vane, of the plurality of vanes, is configured to provide a radial-to-axial flow ratio in a target range, and wherein as a ratio of the depth of the vane to a diameter of the mixing tube is in a range of approximately 0.06 to approximately 0.1.

16. The SCR system of claim 15, wherein the flow control device is to reduce the radial-to-axial flow ratio to within the target range.

17. The SCR system of claim 15,
wherein the plurality of vanes comprises 8 vanes, and
wherein the ratio of the depth of the vane to the diameter of the mixing tube is approximately 0.1.

18. The SCR system of claim 15,
wherein the plurality of vanes comprises 12 vanes, and
wherein the ratio of the depth of the vane to the diameter of the mixing tube is approximately 0.06.

19. The SCR system of claim 15, wherein a vane angle is equal between each pair of adjacent vanes of the plurality of vanes.

20. The SCR system of claim 15, wherein the radial-to-axial flow ratio is a ratio of a radial flow rate of the exhaust flow around a center axis of the mixing tube to an axial flow rate of the exhaust flow along the mixing tube.

* * * * *